US011939735B2

(12) United States Patent
Elmer

(10) Patent No.: US 11,939,735 B2
(45) Date of Patent: *Mar. 26, 2024

(54) WATERCRAFT

(71) Applicant: Karl-Heinz Elmer, Neustadt am Rübenberge (DE)

(72) Inventor: Karl-Heinz Elmer, Neustadt am Rübenberge (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,076

(22) Filed: May 25, 2022

(65) Prior Publication Data

US 2022/0282444 A1 Sep. 8, 2022

Related U.S. Application Data

(63) Continuation of application No. 16/635,334, filed as application No. PCT/EP2018/070882 on Aug. 1, 2018, now Pat. No. 11,377,810.

(30) Foreign Application Priority Data

Aug. 2, 2017 (DE) ..................... 10 2017 117 552.0

(51) Int. Cl.
*E02D 13/00* (2006.01)
*B63B 3/14* (2006.01)
(Continued)

(52) U.S. Cl.
CPC .............. *E02D 13/005* (2013.01); *B63B 3/14* (2013.01); *B63B 7/00* (2013.01); *B63B 21/50* (2013.01);
(Continued)

(58) Field of Classification Search
CPC ......... B63B 21/24; B63B 21/26; B63B 21/50; B63B 7/00; B63B 3/14; B63B 35/44;
(Continued)

(56) References Cited

U.S. PATENT DOCUMENTS 3,611,728 A * 10/1971 Van't Hof ........... E21B 43/0122
405/60
3,744,254 A * 7/1973 Fennelly ................. E02B 15/08
405/62
(Continued)

FOREIGN PATENT DOCUMENTS

| DE | 202013011742 U1 | 6/2014 |
| DE | 202014005397 U1 | 9/2014 |

(Continued)

*Primary Examiner* — Edwin J Toledo-Duran
(74) *Attorney, Agent, or Firm* — WC & F IP

(57) ABSTRACT

The invention relates to a watercraft having a hull (10), an introduction installation (20) for an object (70) to be anchored in the water, said introduction installation (20) being disposed on said hull (10), and at least one compressor (30) having at least one compressed-air line (40) which leads into the water and is coupled to at least one compressed-air distribution installation (45) which has a horizontal extent and for generating a bubble curtain (50) below the hull (10) has a multiplicity of mutually spaced apart outflow openings (46), characterized in that the hull (10) has at least two sub-hulls (11, 12) which are disposed so as to be mutually spaced apart and connected to one another, and a void (15) which is at least partially surrounded by the bubble curtain (50) is situated between the sub-hulls (11, 12).

22 Claims, 17 Drawing Sheets

(51) Int. Cl.
  *B63B 7/00* (2020.01)
  *B63B 21/50* (2006.01)
  *B63B 35/44* (2006.01)
  *E02D 7/00* (2006.01)
  *E02D 7/06* (2006.01)

(52) U.S. Cl.
  CPC ............... *B63B 35/44* (2013.01); *E02D 7/00* (2013.01); *E02D 7/06* (2013.01)

(58) Field of Classification Search
  CPC .... E02B 17/02; E02B 17/027; E02B 15/0814; E02D 7/02; E02D 13/04; E02D 27/525; E02D 13/005; E02D 7/00; E02D 7/06; E02D 13/00; E21B 41/08
  USPC .................. 405/224, 225, 226, 227, 228
  See application file for complete search history.

(56) References Cited

U.S. PATENT DOCUMENTS

| | | | | |
|---|---|---|---|---|
| 4,272,059 A | * | 6/1981 | Noerager | E21B 19/002 254/392 |
| 4,625,302 A | * | 11/1986 | Clark | G10K 11/30 367/24 |
| 8,500,369 B2 | * | 8/2013 | Mohr | E02D 7/02 181/198 |
| 9,410,403 B2 | * | 8/2016 | Wochner | E21B 41/0007 |
| 10,267,006 B2 | * | 4/2019 | Elmer | E02D 7/02 |
| 10,794,032 B2 | * | 10/2020 | Jung | E02D 7/02 |
| 2002/0080681 A1 | * | 6/2002 | Dreyer | E02B 15/0892 367/1 |
| 2002/0108551 A1 | * | 8/2002 | Straume | B63B 35/003 114/219 |
| 2005/0083783 A1 | * | 4/2005 | Baskerville | E02D 13/00 367/1 |
| 2008/0199259 A1 | * | 8/2008 | Cannon | E02D 7/10 405/232 |
| 2010/0119309 A1 | * | 5/2010 | Gibberd | E02D 7/10 405/228 |
| 2011/0031062 A1 | * | 2/2011 | Elmer | E02B 3/062 181/175 |
| 2012/0097476 A1 | * | 4/2012 | Jung | E02D 7/14 181/196 |
| 2013/0056270 A1 | * | 3/2013 | Ward | E21B 41/0007 175/5 |
| 2014/0154015 A1 | * | 6/2014 | Jung | E02D 13/005 405/184.1 |
| 2014/0241815 A1 | * | 8/2014 | Hansen | E02D 13/005 405/248 |
| 2015/0078833 A1 | * | 3/2015 | Elmer | E02D 13/005 405/195.1 |
| 2015/0275451 A1 | * | 10/2015 | Sørstrøm | B05B 13/0278 239/159 |
| 2017/0016199 A1 | * | 1/2017 | Elmer | G10K 11/16 |
| 2017/0306582 A1 | * | 10/2017 | Elmer | E02D 13/005 |
| 2020/0018034 A1 | * | 1/2020 | Schupp | B01D 61/56 |
| 2020/0333490 A1 | * | 10/2020 | Hegna | G01V 1/345 |

FOREIGN PATENT DOCUMENTS

| | | | |
|---|---|---|---|
| DE | 102014113676 A1 | 12/2015 | |
| EP | 2546829 A2 | * 1/2013 | ........... E02D 13/005 |
| WO | WO-2015185041 A2 | * 12/2015 | ........... E02D 13/005 |

\* cited by examiner

WATERCRAFT

CROSS-REFERENCE TO RELATED APPLICATIONS

This application is a continuation application of U.S. Ser. No. 16/635,334 filed Jan. 30, 2020, now U.S. Pat. No. 11,377,810, which was a national stage filing under Rule 371 from International Application PCT/EP2018/07082 filed Aug. 1, 2018, which claimed priority to German Application 10, 2017 117 552.0 filed Aug. 2, 2017.

The invention relates to a watercraft having a hull, an introduction installation, in particular a drilling or piling installation, for a construction project to be erected in the water, and a compressor, as well as a compressed-air distribution installation for such a watercraft. A watercraft is understood to include all buoyant or floating installations which are capable of supporting a drilling or piling installation. The installations can be equipped with a motor or another drive or a sail such that the installation can maneuver autonomously. Alternatively, the installation does not have any drive and has to be towed to the respective application site.

Ships or watercraft which are equipped with a drilling or piling installation for introducing foundations, supports or pipes are often used for erecting construction projects which are anchored on or in the ground of a body of water. Components of the construction project are anchored to the ground of the body of water by way of said introduction installation. Examples of such construction projects are wind power plants, oil rigs, or landing platforms, in particular in the sea.

Noise pollution which is not insignificant and can damage above all marine mammals which are sensitive to noise is created by the piling of posts, for example. Orientation difficulties as well as deafness can arise on account of the influence of noise. One measure for damping noise is a so-called bubble curtain in which compressed-air hoses are placed around the underwater construction site. The compressed-air hoses are connected to compressors which pump compressed air into the hoses on the seabed. The compressed air rises in the form of a curtain of air bubbles, and thus forms a physical-acoustic barrier which attenuates the acoustic waves. It is known for a plastics-material pipe provided with nozzle openings to be placed at a radius about a construction site on the seabed, and be supplied with compressed air during the piling works so as to achieve a minimization in terms of acoustics.

DE 10 2014 113 676 A1 describes a hydraulic acoustics damper for attenuating hydraulic acoustics, in particular in a region of a construction site of an object to be introduced into a underwater bed, as well as a method for handling such a hydraulic acoustics damper in which method the hydraulic acoustics damper is winched down from a watercraft down to a bed of the body of water. The hydraulic acoustics damper is placed around the component to be introduced into the bed of the body of water, and is moved from an open position to a closed position. The hydraulic acoustics damper can have acoustic attenuation elements fastened to a support structure, and moreover a hose for generating a bubble curtain and/or for generating or controlling, respectively, buoyancy can be held in a ground element.

It is an object of the present invention to provide a watercraft and a compressed-air distribution installation by way of which simplified assembling can take place with improved hydraulic acoustics damping.

Said object is achieved according to the invention by a watercraft having the features of the main claim and by a compressed-air distribution installation having the features of the coordinate independent claim. Advantageous design embodiments and refinements of the invention are disclosed in the dependent claims, the description, as well as the figures.

The watercraft having a hull, an introduction installation, in particular a piling installation, for a construction project to be erected in the water, said introduction installation being disposed on said hull, and a compressor which is disposed on the hull, for example, or a separate support construction, having at least one compressed-air line which leads from the compressor into the water and is coupled to at least one compressed-air distribution installation which is in particular disposed below the hull and which has a horizontal extent and for generating a bubble curtain below the hull has a multiplicity of mutually spaced apart outflow openings, provides that the hull has at least two sub-hulls which are disposed so as to be mutually spaced apart and connected to one another, and that a void which is at least partially surrounded by the bubble curtain is situated between the sub-hulls. On account of the design embodiment of the void between the sub-hulls, it is possible for a post, a piylon, or another object which is to be anchored to or in the underwater bed, or else another drilling device, to be handled in a controlled manner and for improved acoustic damping to be simultaneously achieved by way of a bubble curtain. The bubble curtain extends at least partially, preferably completely, around the void and circumferentially surrounds the introduction installation, or the object to be introduced into the underwater bed, respectively. On account of the disposal of the introduction installation within the void between the sub-hulls, the watercraft becomes part of the hydraulic acoustic damping installation and forms the upper completion of the bubble curtain. The bubble curtain which is generated below the hull by the compressed-air installation, rises upward toward the surface and there either surrounds the hull or is situated within the void or surrounds the void between the two sub-hulls, current conditions permitting. A sub-hull is considered to be individual hulls which are coupled to one another by one or a plurality of transverse supports or cross members, in a manner similar to a catamaran, or else each of the two forwardly protruding legs in the case of a U-shaped hull shape. A sub-hull is likewise considered to be present when a manhole is present in a watercraft and an opening through which the access to the body of water is enabled is present in the manhole floor or in the floor. The sub-hulls in this instance extend in the region beside the opening or the manhole.

The compressed-air distribution installation preferably configures a closed circumference, preferably closed around the object to be introduced, such that a circumferentially closed bubble curtain can be created about the introduction installation and about the object to be introduced into the underwater bed.

The compressed-air distribution installation can be configured as a tube or hose through which the compressed air from the at least one compressor is directed. For generating a bubble curtain, the mutually spaced apart outflow openings are preferably configured having identical mutual spacings in the tube or hose. Outflow openings having dissimilar flow cross sections or diameters can be disposed or configured in the compressed-air distribution installation so as to be able to generate dissimilar bubble sizes. The outflow openings having dissimilar diameters and outflow cross sections can be distributed uniformly across the circumference of the compressed-air distribution installation so as to generate a uniform bubble curtain.

Ballast installations for enabling lowering of the compressed-air distribution installation and simultaneously for avoiding buoyancy or rising when introducing compressed air can be disposed on the compressed-air distribution installation. In principle, the compressed-air distribution installation can be configured so as to be buoyant and lowerable. The buoyancy is provided in particular by buoyancy panels on the compressed-air distribution installation, said buoyancy panels being able to be flooded for lowering. The compressed-air distribution installation has in particular a frame which is either autonomously buoyant and can be lowered by way of ballast panels, or which has buoyancy panels which hold the frame and the components disposed thereon, such as a support element or support elements, hydraulic acoustic damper elements, or other installations, above water. The frame can be configured so as to be divisible. The frame can have a lowerable part and a buoyant part, the bubble curtain being able to be configured therebetween. The lowerable part can be coupled to the buoyant part by way of a support element or a plurality of support elements to the buoyant part such that a tubular structure results upon lowering on which hydraulic acoustic dampers are disposed, for example. The hydraulic acoustic dampers can be air-filled hollow panels or panels filled with a foam material, which preferably have a flexible and/or elastic casing.

The compressed-air distribution installation by way of at least one holding installation is preferably fastened so as to be lowerable on the hull of the watercraft, for example by way of winches, cables, or chains or ropes, such that the compressed-air distribution installation can be lowered when required and optionally be lifted again from the underwater bed and be fixed to the hull or lifted onto the watercraft. It is thus possible for maintenance works to be carried out, the watercraft to be moved to a further construction site, or the compressed-air distribution installation to be stored on or on top of the watercraft.

In one refinement of the invention it is provided that the compressed-air distribution installation extends around the entire external circumference of the hull, thus that the two sub-hulls, like the void present between the sub-hulls, are surrounded by the compressed-air distribution installation. The compressed-air distribution installation in this embodiment forms an external framework for the watercraft such that the hull is situated within the bubble curtain when the bubble curtain rises vertically. Said compressed-air distribution installation can also be used in combination with at least one further compressed-air distribution installation which is situated within the void or within the void has been lowered onto the bed of the body of water.

The void between the sub-hulls can be completely surrounded by the sub-hulls such that a passage through which the introduction installation or the component to be anchored in the bed of the body of water can be launched into the water and anchored in the bed of the body of water is situated in the bottom of the ship. A compressed-air distribution installation can likewise be lowered through the passage. The two sub-hulls can however also be coupled to one another by way of at least one cross member, in a manner similar to a catamaran, so as to configure a larger void between the two sub-hulls. A lateral free access is obtained in the case of only one cross member, in particular when viewed from the bow or the stern. If the cross member or the cross members are disposed above the waterline, the void forms a passage. On account thereof, buoyant objects which are to be anchored in the bed of the body of water, for example, can be moved between the sub-hulls without there being any restriction in terms of the length of the object. In this instance, a lifting installation or a holding installation by way of which the object to be anchored is held on the watercraft while the end that is not being held is lowered and is anchored at the envisaged location in the bed of the body of water is disposed on the watercraft. The hull shape of the watercraft can also be configured so as to be U-shaped, having two sub-hulls which are directed to the front and which are permanently connected to one another by a transverse hull. The control installation for the watercraft, a crane installation, as well as for the introduction installation can be disposed on the transverse hull. The transverse hull can also support at least part of the introduction installation.

In order either to minimize the bubble curtain, or else to generate a smaller bubble curtain which is situated closer to the object to be anchored in addition to a bubble curtain that surrounds the complete hull, it is provided in one refinement of the invention that the compressed-air distribution installation or a further compressed-air distribution installation surrounds only the circumference of the void. In as far as the void is not completely enclosed by the hull, thus has a lateral access, the compressed-air distribution installation bridges the at least one lateral access or the plurality of lateral accesses so as to configure a circumferentially closed bubble curtain which has a circumference that is smaller than the circumference of the entire watercraft.

In order to achieve further improved acoustic damping, it is provided in one refinement of the invention that at least one support element which laterally surrounds the object to be anchored and which preferably completely circumferentially surrounds the object to be anchored is disposed below the hull of the watercraft. By completely surrounding the object to be anchored by way of the support element or the support elements, the bubbles of the bubble curtain can in this instance be guided and be prevented from being laterally deflected, for example. The at least one support element, apart from completely encasing the object to be anchored, can also only partially laterally surround the object to be anchored. A plurality of support elements which are disposed below the hull and which in each case partially surround the object to be anchored can also be disposed or configured, said plurality of support elements conjointly configuring a support element structure which in its entirety laterally surrounds the object to be anchored. Gas-filled flexible damper elements which can be configured in arbitrary shapes, for example, as hollow spheres, foam elements, filled hoses, or hollow panels, or foam panels, can be fastened to the at least one support element. An active/passive system for minimizing underwater acoustics is provided by way of the combination of a bubble curtain and damper elements.

The at least one support element is preferably capable of being passed through by a flow of the ambient water, that is to say that said at least one support element does not configure a closed or almost closed surface, such that only a minor flow resistance is provided by the support element.

In one refinement of the invention it is provided that a plurality of support elements are disposed in a telescopic manner on one another, so as to be able to provide either a multi-layer casing or, by deploying or retracting the support elements into one another, enable easy adapting to the respective conditions in the case of dissimilar water depths. To this end, the support elements are preferably equipped with dissimilar diameters which are graded such that the external diameter of the respective inner support element is smaller than the internal diameter of the surrounding support element. In the case of cross sections that are not round, mutually corresponding internal and external dimensions are provided in such a manner that the support elements are mounted so as to be displaceable into one another in order for the length of the overall support element to be modified.

The support element which is configured, for example, as a net, a tubular steel construction, a plate construction, and/or as a mesh, can be fastened to a frame which is disposed below the hull and for configuring a hydraulic acoustic damping installation is lowered onto the bed of the body of water. Apart from the support element which is fastened to the frame and for mounting can be mounted within the frame which may have a U-shaped cross-section, a compressed-air distribution installation can be mounted in or on the frame or in a separate frame from a dimensionally stable material. The respective frame at least partially surrounds the component to be anchored and ensures weighting of the support element as well as the compressed-air distribution installation. Moreover, the frame establishes contact with the bed of the body of water. In a combined disposal of the compressed-air distribution installation and the support element in the frame it is possible for only one of said components to be in each case disposed in a frame.

Apart from the U-profile, other profile shapes can also be provided for the cross section of the frame, for example so as to receive therein the support element or the compressed-air distribution installation, or a plurality of support elements and compressed-air distribution installations. A T-profile, an H-profile, or a combination of a U-profile having a T-profile disposed therebelow, can thus be provided. In this instance, the support element and the compressed-air distribution installation or compressed-air distribution installations can be disposed in the respective separated regions of the frame, so as to be separately fastened and fixed to the frame in said regions. The frame can be part of the compressed-air distribution installation.

The frame is preferably fastened so as to be lowerable on the hull, in particular by way of motor-operated winches or other lifting installations. Holding installations such as ropes, chains, or cables can connect the watercraft to the frame. It is also possible for the coupling of the watercraft to the frame to take place solely by way of the support element. The frame can have buoyancy panels which can be filled with air or another gas so as to facilitate floating and recovering of the compressed-air distribution installation.

The frame can be configured so as to be foldable or collapsible, so as to enable components already anchored in the ground or standing upright therein to be able to be surrounded by the frame and thus the bubble curtain, or the support element, respectively. The frame in this instance is moved close to the object to be anchored in the folded-out state, and is subsequently folded, moved, displaced or collapsed such that the compressed-air distribution installation and/or the support element surround/surrounds the object to be anchored in an ideally fully circumferential manner so as to ideally enable hydraulic acoustic damping on all sides.

The frame can be configured from interconnected segments, wherein the connection locations of the segments permit a mutually relative movement of the segments. Apart from a collapsible design embodiment or foldable design embodiment, a mutually displaceable mounting of a plurality of frame components is also possible, so as to generate an ideally closed circumference of the frame.

The frame for opening or closing can be assigned a drive for folding out, unfolding, or displacing the frame for opening or closing.

Outflow openings in the compressed-air distribution installation can be oriented in dissimilar directions so as to generate a wider bubble curtain, or else a bubble curtain having two radii, for example when the outflow openings are oriented so as to be substantially horizontal in mutually opposite directions. The bubble curtains can extend upward to the water surface within and/or outside the support element or the support elements, depending on the disposal of the outflow openings and on the alignment of the openings toward the inside, the outside, or in both directions.

A plurality of compressed-air distribution installations can be disposed at dissimilar heights, wherein the compressed-air distribution installations in one refinement at dissimilar heights have outflow openings of dissimilar sizes and/or dissimilarly high internal pressures, so as to on account thereof achieve a variation in terms of the acoustic damping on dissimilar levels. In principle, it is also possible for a single compressed-air distribution installation in regions to also have outflow openings of dissimilar sizes, for example when current conditions or preferred directions of acoustic dissemination are to be considered.

The invention likewise relates to a compressed-air distribution installation per se, such as has been described above. The compressed-air distribution installation is able to be attached to a watercraft and is at least partially lowerable such that a bubble curtain can be configured in the region of the watercraft below the hull. The compressed-air distribution installation can also be autonomously buoyant. As ballast for the compressed-air distribution installation which can be configured as a hose, the latter can be provided with a chain or other ballast elements so as to avoid unintentional floating of the compressed-air installation. A frame as part of the compressed-air distribution installation can be configured so as to be lowerable.

Compressors for generating compressed air can be disposed on the buoyant part of the compressed-air distribution installation so as to be able to provide an autonomous module for hydraulic acoustic damping.

Exemplary embodiments of the invention will be explained in more detail hereunder by means of the appended figures in which.

Figure 1:
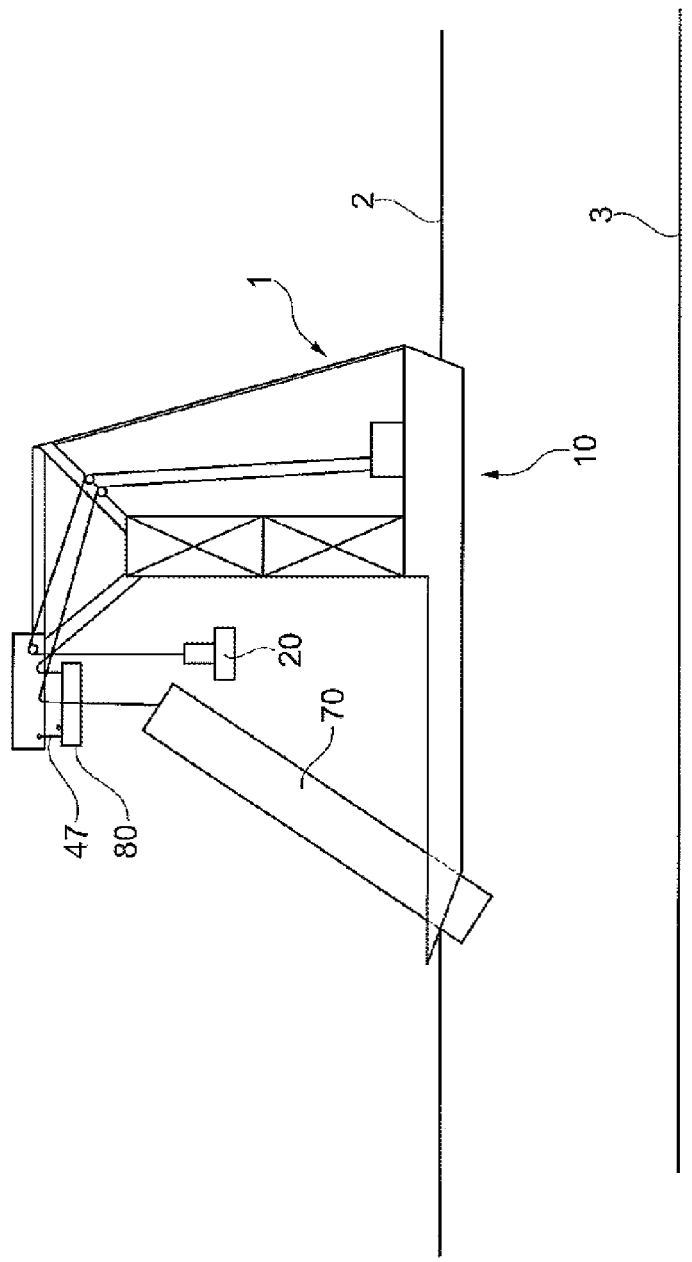
FIGS. 1 to 4 show various sequence phases of anchoring a component in a bed of a body of water.

FIGS. 1 to 4 show various phases when installing an object 70, in the exemplary embodiment illustrated a post, to be anchored in water, said object 70 intended to be anchored in a bed of a body of water 3 below a water surface 2. A watercraft 1 in the form of a ship which has a hull 10 on which an introduction installation 20 in the form of a pile hammer is disposed is provided to this end. The introduction installation 20 by way of a cable pull system having a drive is held on a framework or a crane on the hull 10 and is situated in a standby position. The object 70 to be anchored on the bed of the body of water 3 is configured so as to be initially buoyant and at one end is lifted from the water by way of a crane installation. A frame 80 which by way of holding installations 47 is fastened so as to be lowerable on the crane installation, in particular on a cross member, is fastened above the crane installation. The post 70 in FIG. 1 is partially lifted from the water and is almost situated in the upright position from which it is to be winched down onto the bed of the body of water 3. The frame 80 is situated in an initial position above the object 70 and contains installations for damping hydraulic acoustics and optionally for generating a bubble curtain.

Figure 2:
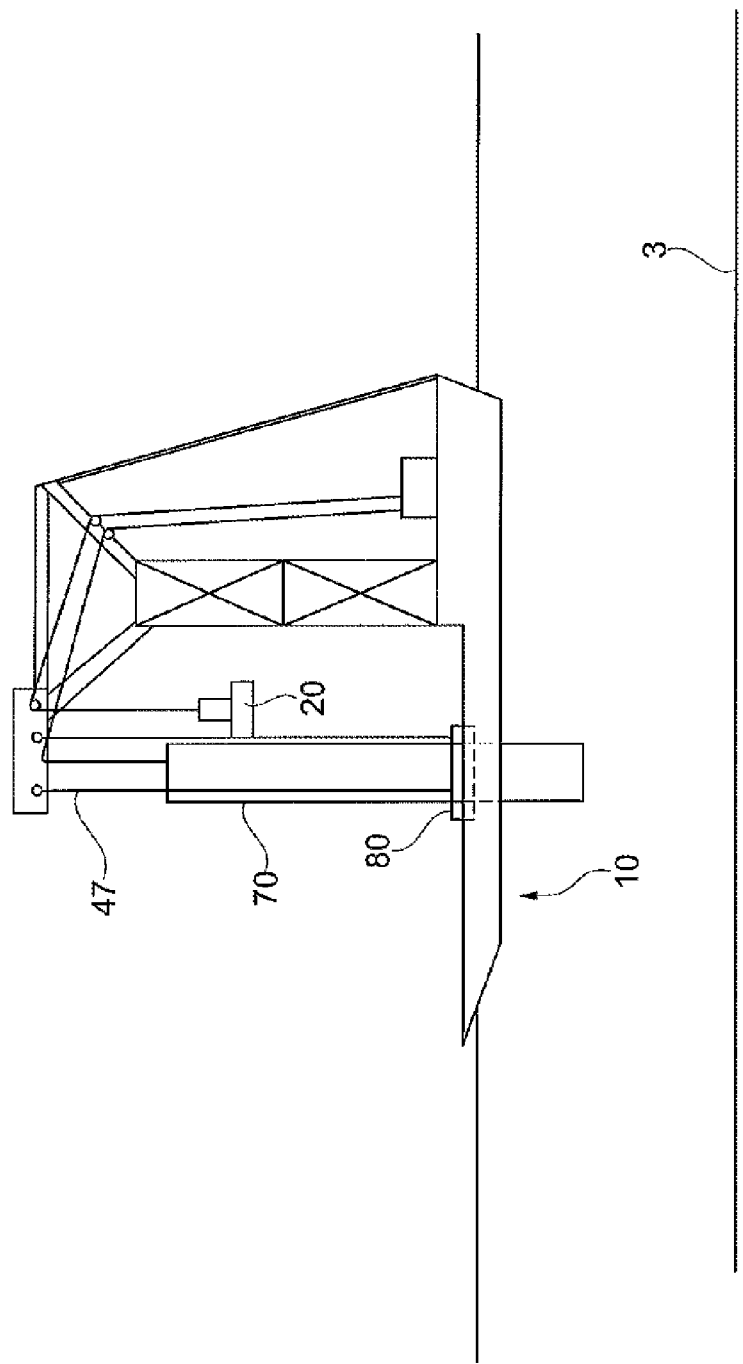

FIG. 2 shows the object 70 in an upright position above the location on the bed of the body of water 3 where the post 70 is to be introduced, in particular piled. The frame 80 is situated in a lowered position level with the surface of the body of water 2 and has been lowered on ropes, belts, or chains.

Figure 3:
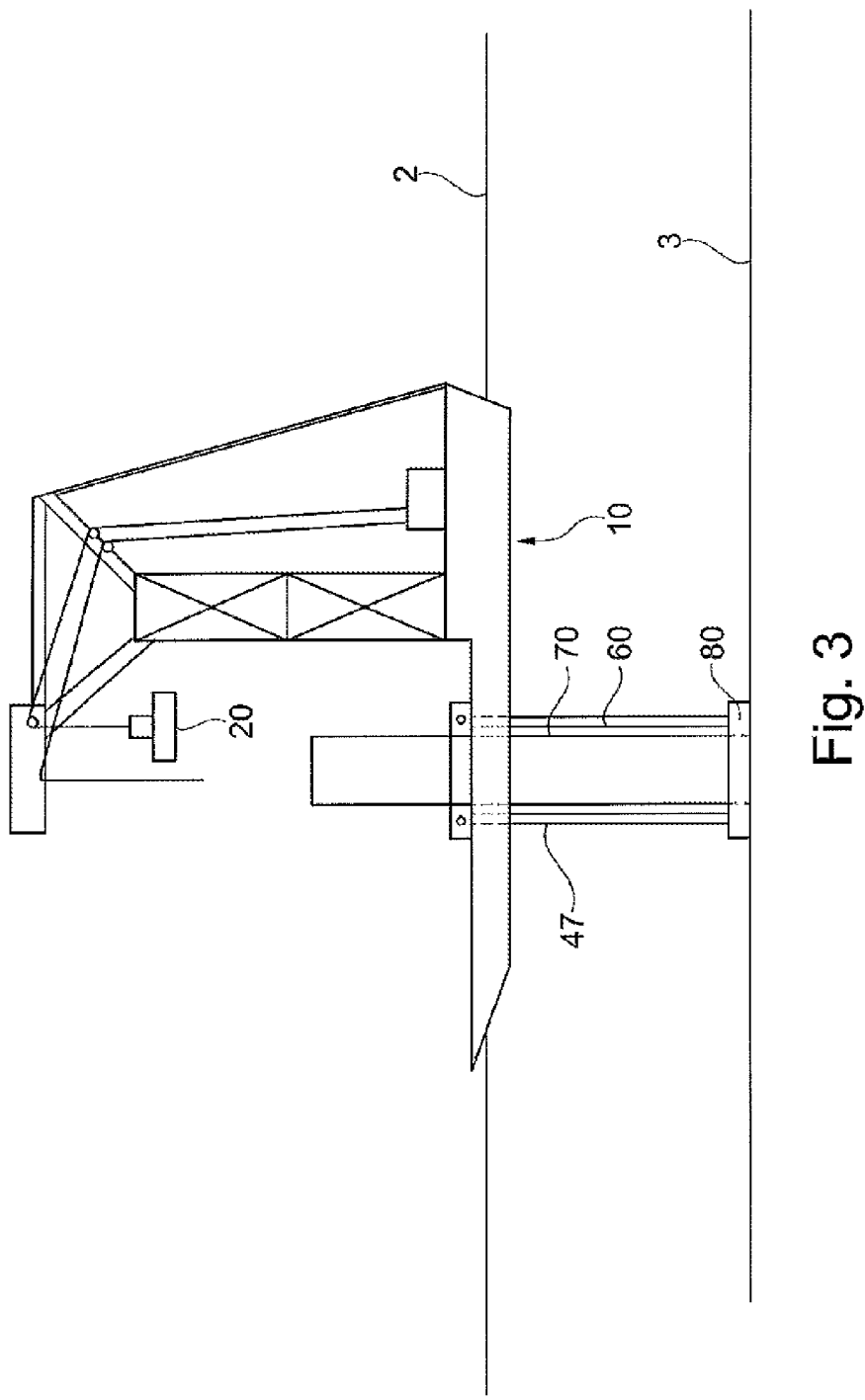

The post 70 in FIG. 3 is situated in the desired position on the bed of the body of water 3, the frame 80 having the holding installations 47, for example ropes, which are fastened to winches on the hull, as well as a tubular support element 60 have been winched down. The tubular support element 60, in particular configured as a net or mesh, extends in a fully circumferential manner about the post 70; the holding installations 47 run so as to be substantially parallel with the longitudinal extent of the post 70.

Figure 4:
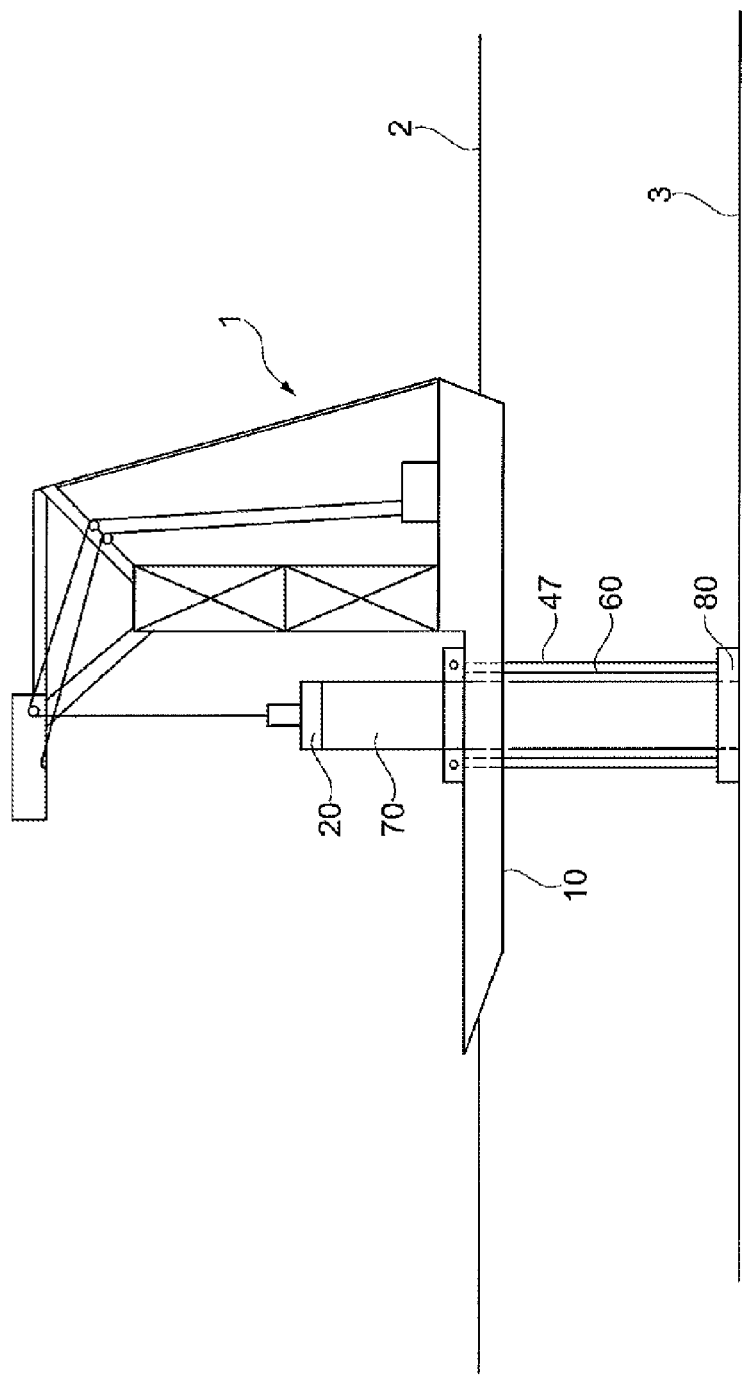

FIG. 4 shows that the watercraft 1 in a next phase has moved somewhat forward such that the introduction installation 20, for example a hammer, is disposed above the post 70 and is placed on top of the latter. The piling of the post 70 can commence in such a position. The hydraulic acoustics generated by the piling during the piling using the introduction installation 20 is damped by damper elements (not illustrated) which are designed, for example, as gas-filled flexible damper elements and are fastened to the support element 60. The support element 60, conjointly with the damper elements, is accommodated within the frame 80 or the so-called box when the frame 80 is situated on the watercraft and is winched down to the bed of the body of water 3. To this end, the frame by way of holding elements 47 is winched down by the crane installation on the watercraft 2 and optionally separated therefrom, wherein the frame by way of other holding elements 47 is fastened to the hull 10 or remains coupled to the latter.

Moreover, compressors by way of which the compressed air is directed through a compressed-air line to a compressed-air distribution installation are disposed on the hull 10 of the watercraft 1, said compressed-air distribution installation in one variant of the invention likewise being situated on or in the frame 80. A bubble curtain which for avoiding any further minimizing of the noise pollution on account of the object 70 being introduced extends around the object 70 to be anchored is thus generated during the introduction procedure of the post 70, for example by piling or drilling. The bubble curtain within and/or outside the support element can move upward to the water surface 2.

The support element 60 is configured such that water can pass through the intermediate spaces in the support element which is in particular configured as a net or mesh. The damper elements can be situated within or outside the tubular support element 60 and also be fastened to the latter on both sides. The hydraulic acoustic damping installation can thus be designed and used with as well as without a bubble curtain.

Upon anchoring of the object 70 in the bed of the body of water 3, the frame 80 conjointly with the damper elements, optionally the compressed-air distribution installation, as well as the support element 60, is pulled to the surface by way of the holding installations 47. This takes place by way of winches or the like which are disposed on the watercraft 1.

Figure 5:
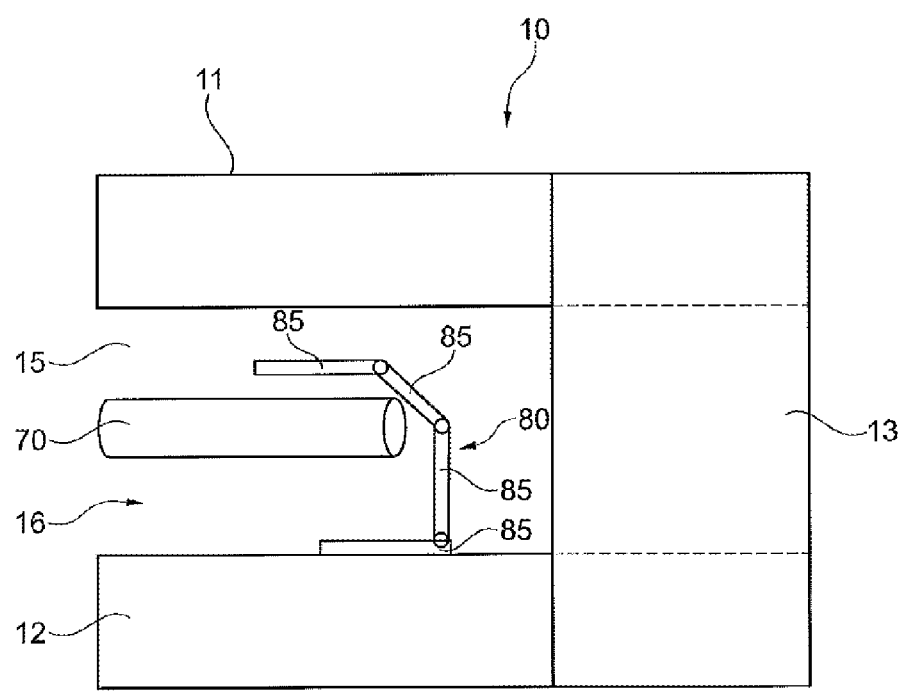
FIG. 5 shows a plan view of a watercraft when preparing an anchoring.

FIG. 5 shows a variant of the invention in which the frame 80, as opposed to FIG. 1, is not situated above the lifted post 70 on the crane installation, but is already fixed to the hull 10, corresponding to the terminal position in FIG. 2. It can be seen in FIG. 5 that the hull 10 is composed of two sub-hulls 11, 12 which are connected to one another by way of a cross member 13. A void 15 from which the object 70 can be winched down into the water and introduced into the bed of the body of water 3 and be anchored therein is configured between the two sub-hulls 11, 12. The frame 80 is situated within the void 15 which has at least one front access 16 such that the object 70 to be introduced can protrude forward beyond the hull 10 when said object 70 is to be transported in a floating manner. In principle, it is also possible for the hull 10 to be configured so as to be also closed at the bow such that the void 15 is surrounded by sub-hulls on all sides. Likewise, two cross members 13 disposed above the water line 2 on the sub-hulls 11, 12, conjointly with the sub-hulls can completely surround the void 15 in the plan view, but below the cross members 13 enable a passage which is directed in the longitudinal extent of the hull 10 and has an access 16 at the bow and at the stern. Alternatively, the void 15 is enclosed on all sides up to the water surface 2 by the hull 10 or the sub-hulls. The object 70 or post to be introduced in this instance is either not longer than the void 15 which is situated in the ship and has no floor and permits the object 70 to be lowered, or the object 70 is handled in a different manner and is winched down upright through the void 15 in the direction of the bed of the body of water 3.

It can be seen in FIG. 5 that the frame 80 is composed of a plurality of segments 85 which are mounted in an articulated and/or displaceable manner on one another. The segments 85 in the illustrated phase of the introduction of the object 70 are mutually mounted such that the object 70 can be introduced into the opened frame 80. This takes place by lifting the object 70 at one end, and lowering and pivoting the other end about the upper center of rotation.

Figure 6:
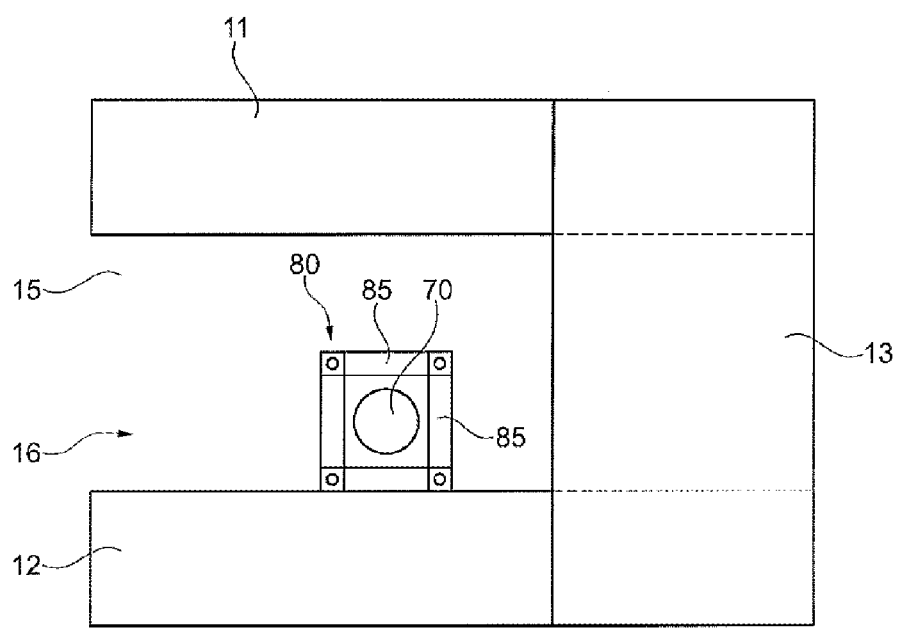
FIG. 6 shows a plan view of a watercraft according to FIG. 3.

The position resulting on account thereof, prior to the object being introduced into the bed of the body of water, is illustrated in FIG. 6. The object 70 to be introduced is situated in an upright position and is placed onto the bed of the body of water 3. The frame 80 is closed and surrounds the post or object 70 in a fully circumferential manner. The frame 80 is subsequently lowered by way of winches or the like onto the bed of the body of water 3, and lowered by way of holding installations 47 as previously described in FIGS. 1 to 4. After the winching-down and the lowering, the object 70 by way of the introduction installation 20 is then anchored in the bed of the body of water 3.

Figure 7:
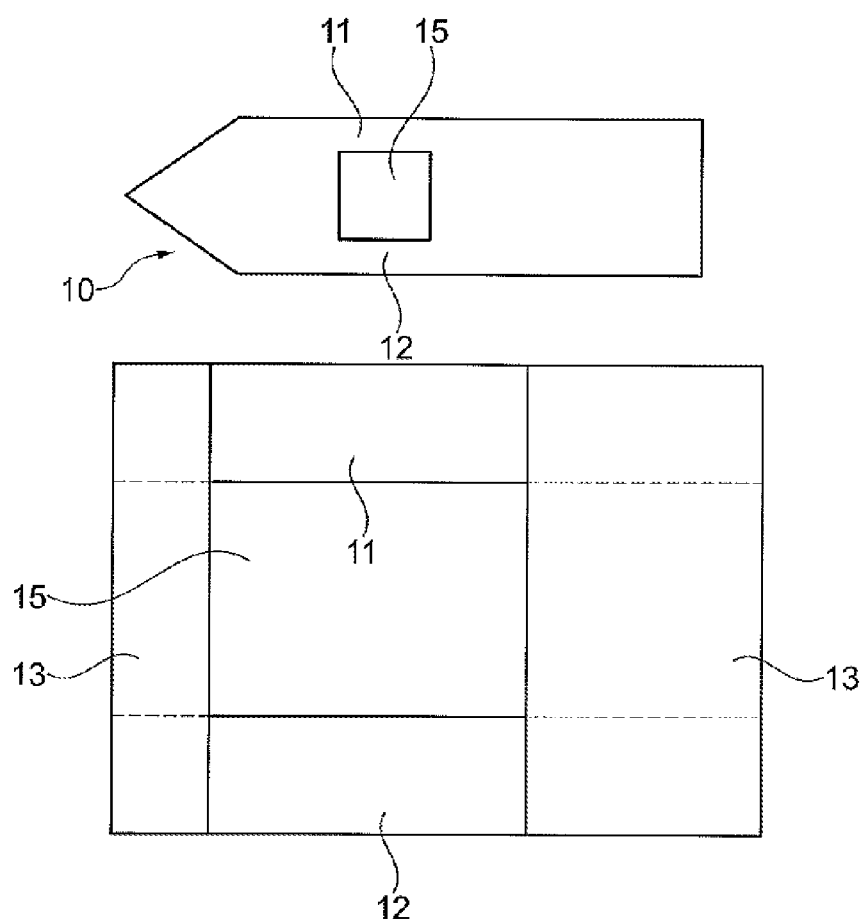
FIG. 7 shows plan views of hull variants.

Two variants of the hull shape are illustrated in FIG. 7. The upper illustration shows a conventional hull shape 10 having a central manhole which enables a passage toward the body of water. The hull bottom in the region of the manhole is removed or removable such that the object (not illustrated) can be introduced through the watercraft into the bed of the body of water. The void 15 is situated within the hull 10; the sub-hulls 11, 12 run to the left and the right of the void 15. The lower illustration shows a hull 10 as in FIGS. 5 and 6, but having two cross members or transverse supports 13 which extend above the two sub-hulls 11, 12 running in parallel. The void 15 in the plan view is surrounded by the cross members 13 and the sub-hulls 11, 12.

Figure 8:
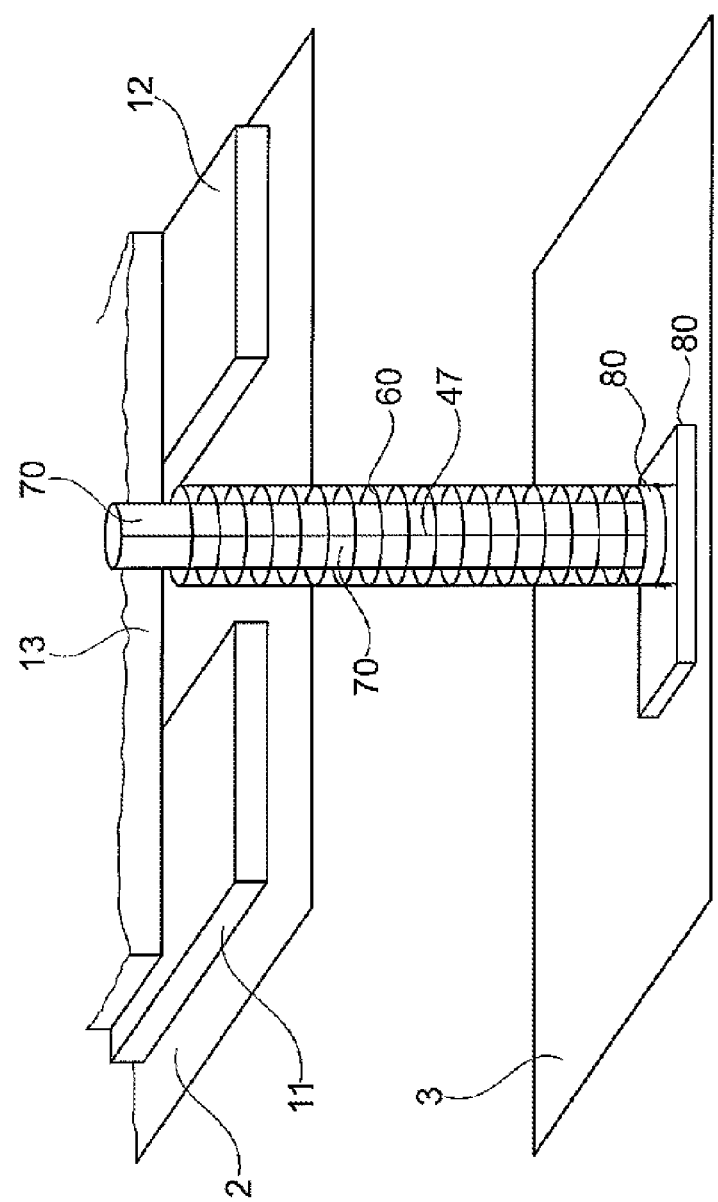
FIG. 8 shows a first design embodiment of an acoustic damping installation during the anchoring.

The watercraft 1 having the two sub-hulls 11, 12 as well as the cross member 13 is schematically illustrated in FIG. 8. The object 70 to be introduced is situated in the upright position; the frame 80 has already been winched down onto the bed of the body of water 3, and the support element 60 in the form of a tubular net having the holding elements 47 reaches from the frame 80 to the surface of the body of water 2 and circumferentially surrounds the object 70. Damping elements 65 (not illustrated) are fastened to the support element 60 which is configured as a net or mesh. The support element 60 represents the first measure for acoustic damping when introducing the object 70 into the bed of the body of water 3. In addition to the support element 60, a bubble curtain within or outside the support element 60 can be provided by way of a compressed-air distribution installation.

Figure 9:
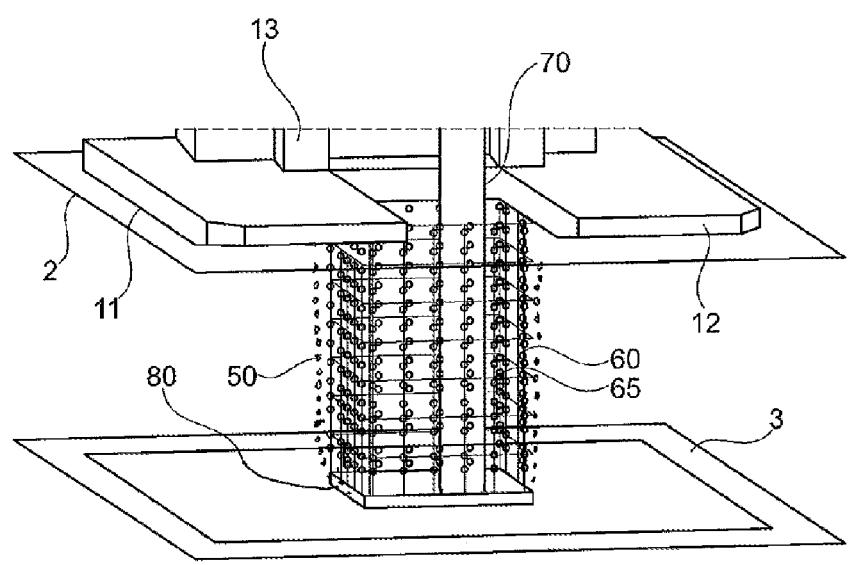
FIG. 9 shows a combination of hydraulic acoustic damper elements and a bubble curtain.

A variant of the invention, in which the frame 80 is disposed at a larger spacing about the object 70 to be introduced is shown in FIG. 9. The mesh width of the support element 60 which extends from the frame 80 to the water surface 2 is larger than that of the support element 60 which in FIG. 8 has a circular cross-section and is situated close to the object 70 to be introduced. The damping elements 65 which are fastened to the support element 60 can be seen in FIG. 9. It can likewise be seen in FIG. 9 that a bubble curtain 50 is used in combination with the gas-filled flexible damping elements 65. The bubble curtain 50 is created by compressed air which by way of a compressed-air distribution installation on the frame 80 is configured circumferentially around the support element 60.

Figure 10:
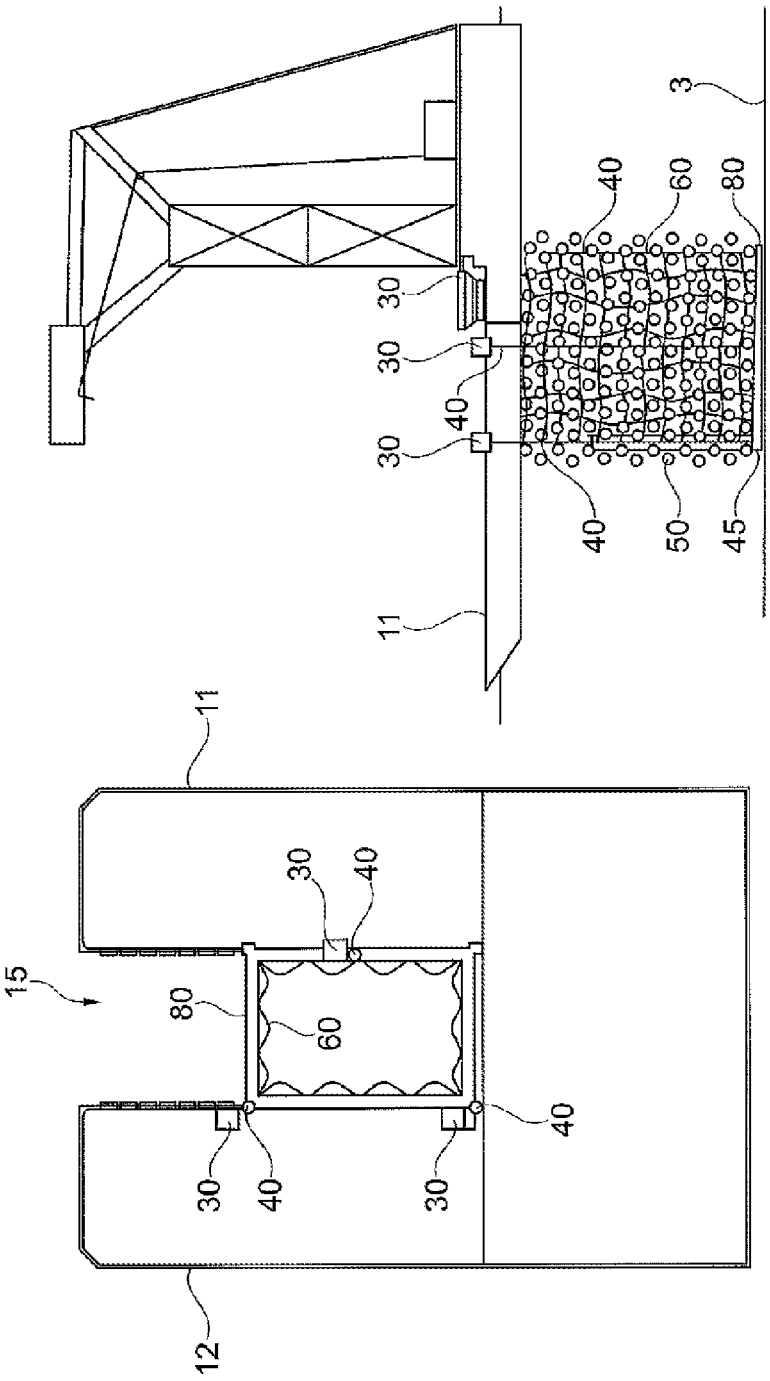
FIG. 10 shows a lateral view and a plan view of a variant of the acoustic damping installation.

FIG. 10 shows the design embodiment according to FIG. 9, in which the frame 80 is lowered onto the bed of the body of water 3, in a lateral view and in a plan view. The right illustration shows a partial sectional illustration of the watercraft 1 having the sub-hull 11 on which compressors 30 are disposed, said compressors 30 by way of compressed-air lines 40 pumping compressed air to the frame 80 situated on the bed of the body of water 3.

The compressed-air lines 40 open into a compressed-air distribution installation 45 which in the exemplary embodiment illustrated is configured so as to fully encircle the frame 80. The compressed-air distribution installation 45 can be fastened in or to the frame 80, and in the case of a fully circumferential disposal distributes the compressed air about the object (not illustrated) to be anchored in the bed of the body of water 3.

It can be seen in the left illustration of FIG. 10 that the support element 60 is disposed within the frame circumference and the compressed-air distribution installation 45 thus configures a closed circumference. On account of the closed circumference it is possible for a closed bubble curtain 50 to be generated within the void 15 between the sub-hulls 11, 12. The bubble curtain 50 thus runs on the internal side of the sub-hulls 12 and bridges the spacing between the two sub-hulls 11, 12.

Figure 11:
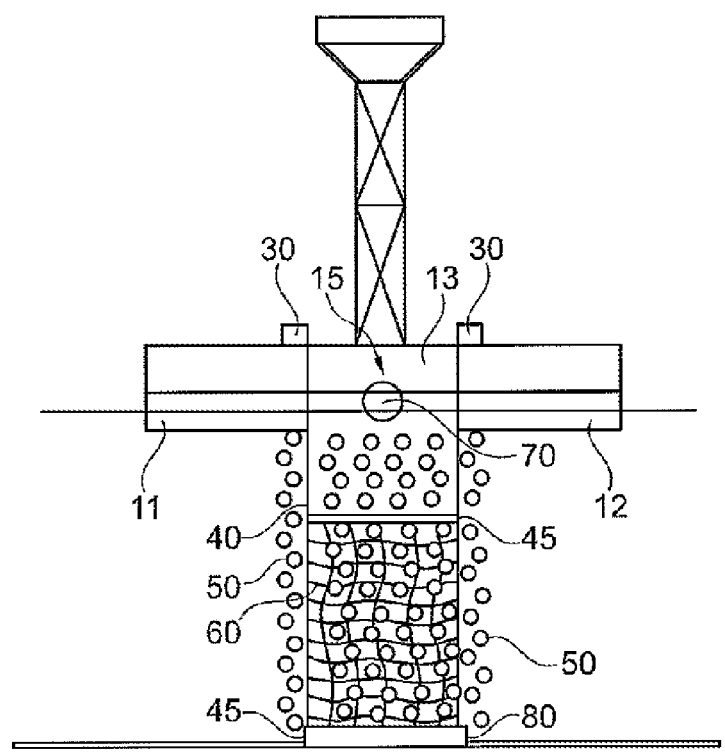
FIG. 11 shows a frontal view of FIG. 10.

FIG. 11 shows the variant according to FIG. 10 in a front view, conjointly with an object 70 which is to be introduced but has not yet been lifted and which is situated in a floating manner between the sub-hulls 11, 12. It can be seen in FIG. 11 that the support element 60 frontally does not extend to the water surface, while the support element 60 on the lateral edges which run parallel with the longitudinal extent of the sub-hulls, reaches to the water surface 2. On account of the height of the support element 60 that is lower toward the bow, it is possible for the object 70 to be anchored, when being lifted, to be transported across the upper periphery of the support element 60 without having to lift the entire object completely out of the water. This facilitates the positioning of the object 70 to be anchored. The object 70 is situated in the void 15 between the two sub-hulls 11, 12 and at the side of the bow protrudes forward beyond the latter. Two compressed-air distribution installations 45 can be disposed on dissimilar levels; the compressed-air distribution installation 45 on the upper completion of the transversely running support element portion can simultaneously serve for transverse stabilizing and, by virtue of an additional compressed-airflow which by way of the compressors 30 and the compressed-air lines 40 is directed into the compressed-air distribution installations 45, leads to an increased bubble density. The bubbles 50 exit the compressed-air distribution installation 45 within and outside the support element 60 and rise to the top.

Figure 12:
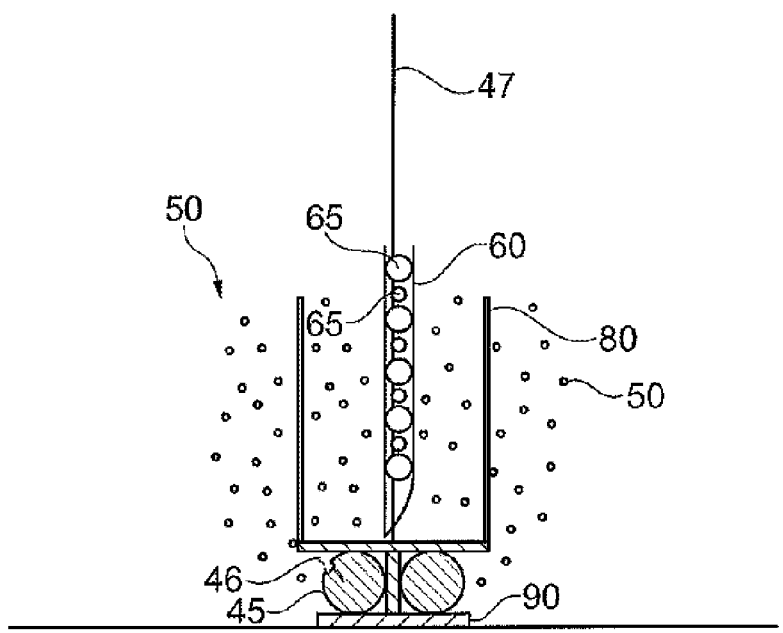
FIG. 12 shows a detailed view of the acoustic damping installation according to FIGS. 10 and 11.

A detailed view of the compressed-air distribution installation according to FIGS. 10 and 11 is shown in FIG. 12. A frame 80 which can be configured, for example, as a U-shaped fully encircling frame, is connected to the winches on the watercraft by way of holding elements 47, for example a steel rope, and by way of said holding elements 47 can be lifted or lowered. A support element 60 which extends upward in the direction of the water surface and on which, or in which, hydraulic acoustic damper elements 65 of dissimilar sizes are disposed is disposed within the frame 80. The damper elements 65 are flexible and gas-filled; said damper elements 65 can be configured as hollow panels or foam panels. The frame 80, the support element 60, the holding elements 47, and the hydraulic acoustic damper elements 65 can be part of the compressed-air distribution installation.

A weight or a ballast installation 90 which is configured as a T-support and by way of the transverse leg is fastened on the frame 30 so as to be oriented toward the base is disposed below the frame 80. Two compressed-air distribution installations 45 are disposed in the intermediate space between the base of the frame 80 and the T-support in the illustrated example, outflow openings 46 being configured in said compressed-air distribution installations 45. The compressed-air distribution installations 45 can be configured as pipes or hoses; the outflow openings 46 in the exemplary embodiment illustrated point in mutually opposite directions such that a bubble curtain 50 is created on both sides of the support element 60, thus on the internal side and on the external side in the case of a closed circumference of the support element. The outflow openings 46 can also be directed downward such that the compressed air is directed in the direction toward the bed of the body of water 3, so as to generate an ideally continuous bubble curtain 50 from the bed of the body of water 3 up to the surface of the body of water 2.

Figure 13:
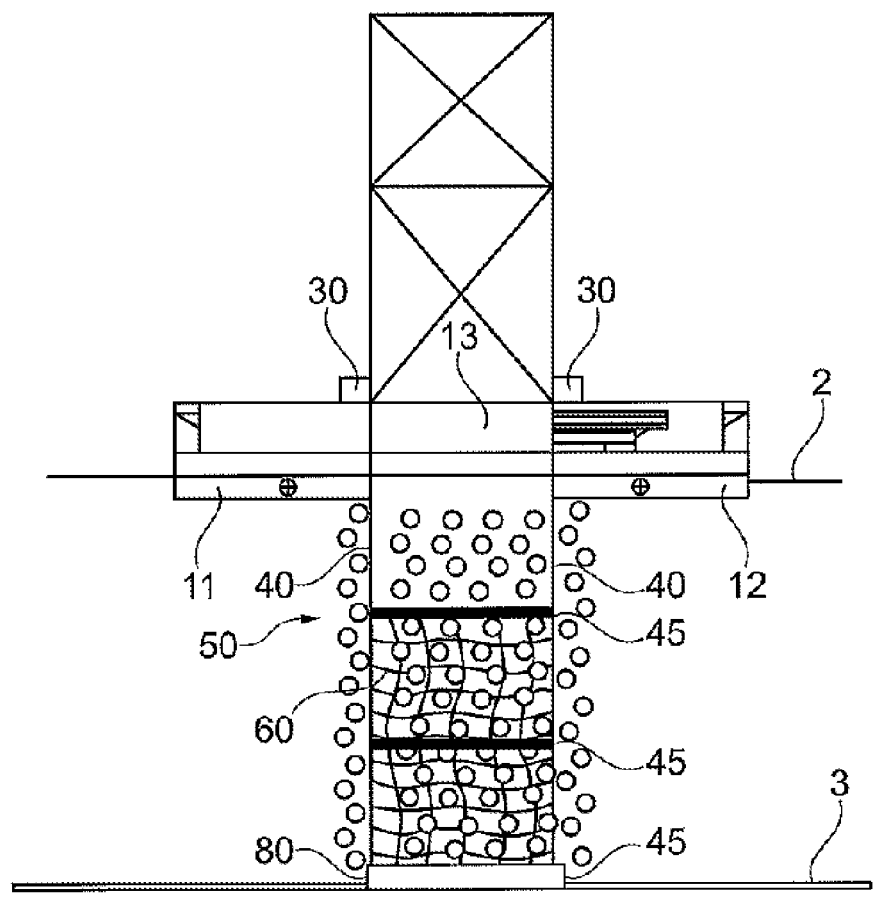
FIG. 13 shows a variant of FIG. 11.

A variant of the invention in which a total of three compressed-air distribution installations 45 are disposed at three different heights is shown in FIG. 13. The frontal view in which the compressed-air distribution installations 45 run in each case transversely to the longitudinal extent of the sub-hulls 11, 12 is shown in the exemplary embodiment illustrated. The compressors 30 pump in each case compressed air through the compressed-air lines 40 to the compressed-air distribution installations 45 which, apart from a pure transverse extent, also extend in a fully circumferential manner around the object 70 to be introduced (not illustrated), or around the frame 80, or the support element 60 of closed configuration.

Figure 14:
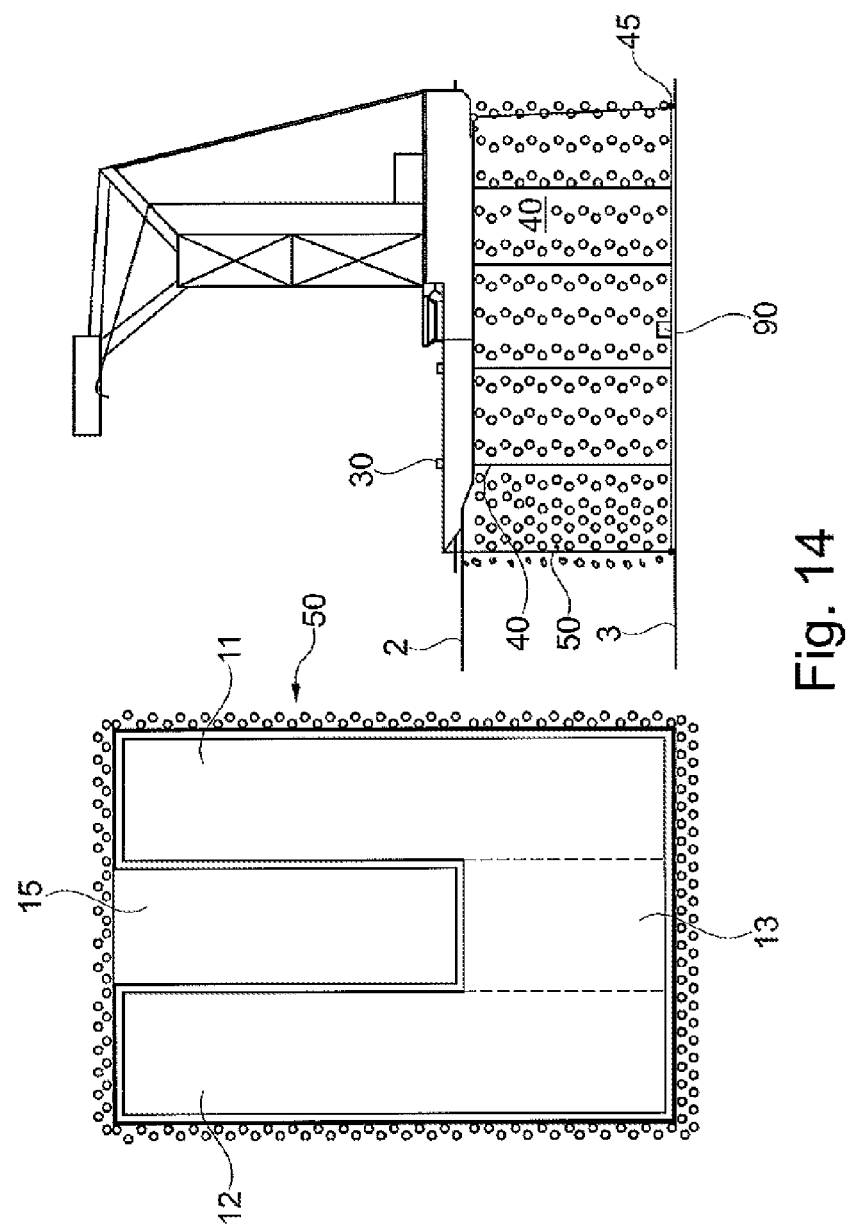
FIG. 14 shows a variant having a bubble curtain surrounding the watercraft.

A third variant of the invention in which a compressed-air distribution installation 45 is disposed externally around the circumference of the watercraft 1 is shown in FIG. 14. Here too, compressed-air lines 40 from compressors 30 lead to the compressed-air distribution installation 45 in which outflow openings 46 (not illustrated) are disposed in dissimilar directions or else in identical directions at dissimilar or identical mutual spacings, so as to generate a bubble curtain 50. The bubble curtain 50 extends around the entire watercraft 1, thus about the two sub-hulls 11 and the void 15 formed between the sub-hulls 11, 12, while including the void 15. In so far as no frame is disposed on the compressed-air distribution installation 45, said frame being lowerable by way of holding installations 47, separate ballast elements or ballast installations 90 for holding the compressed-air distribution installation 45 on the bed of the body of water 3 can also be disposed on the compressed-air distribution installation 45.

Figure 15:
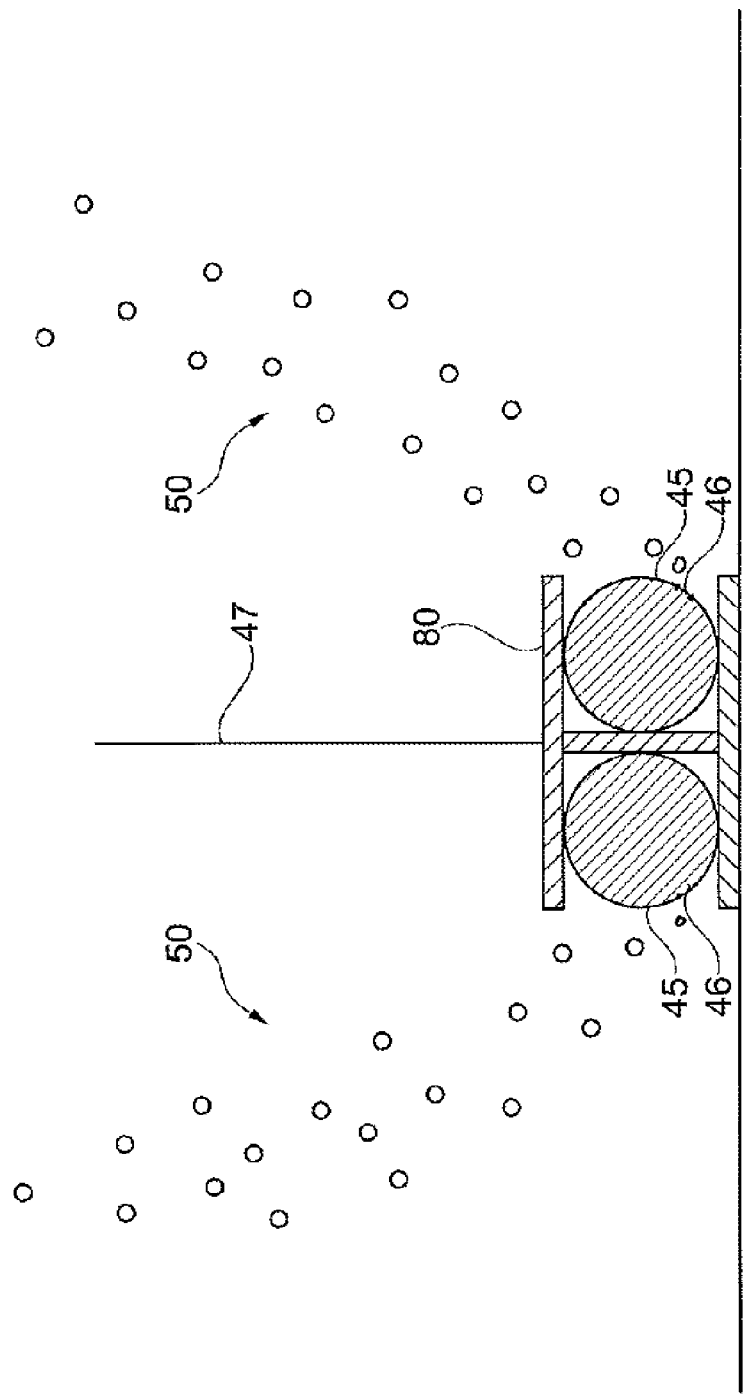
FIG. 15 shows a detailed view of a bubble curtain.

FIG. 15 shows a variant of the invention according to FIG. 14, in which the compressed-air distribution installations 45 are disposed in an H-support, in a detailed view. The compressed-air distribution installations 45 can be configured as pipes or hoses; the frame 80 by way of the holding elements 47 is configured in the form of lowerable or liftable chains or ropes. The frame 80 can be configured in an encircling manner; alternatively, only frame segments can also be configured which by way of the compressed-air distribution installations 45 are connected to one another so as to be movable on one another or else be separate from one another. The frame 80 simultaneously serves as a weight for holding the compressed-air distribution installations 45 having the outflow openings 46 on the bed of the body of water when compressed air is introduced by way of the compressed-air line (not illustrated) and, for configuring a bubble curtain 59, is pumped out of the outflow openings 46. The outflow openings 46 can have dissimilar diameters so as to generate dissimilarly sized bubble diameters in the respective bubble curtain 50. Likewise, dissimilar pressures can prevail within the respective compressed-air distribution installations 45, so as to modify the bubble pattern of the bubble curtain 50.

Figure 16:
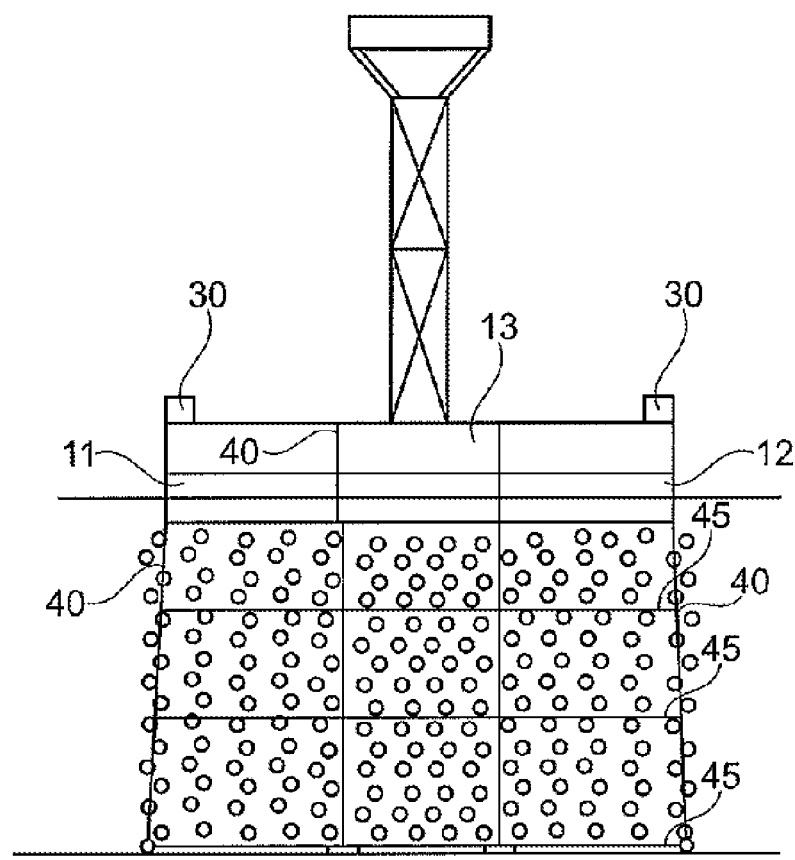
FIG. 16 shows a frontal view of FIG. 14.

A further variant of the invention in which the externally encircling bubble curtain 50 is generated by way of three compressed-air distribution installations 45 which are disposed on dissimilar levels around the entire watercraft 1 is shown in FIG. 16. The externally encircling bubble curtain 50 thus represents the third stage of the hydraulic acoustic damping; the bubble curtain 50 in this instance is positioned so as to be relatively far away from the acoustic source.

Figure 17:
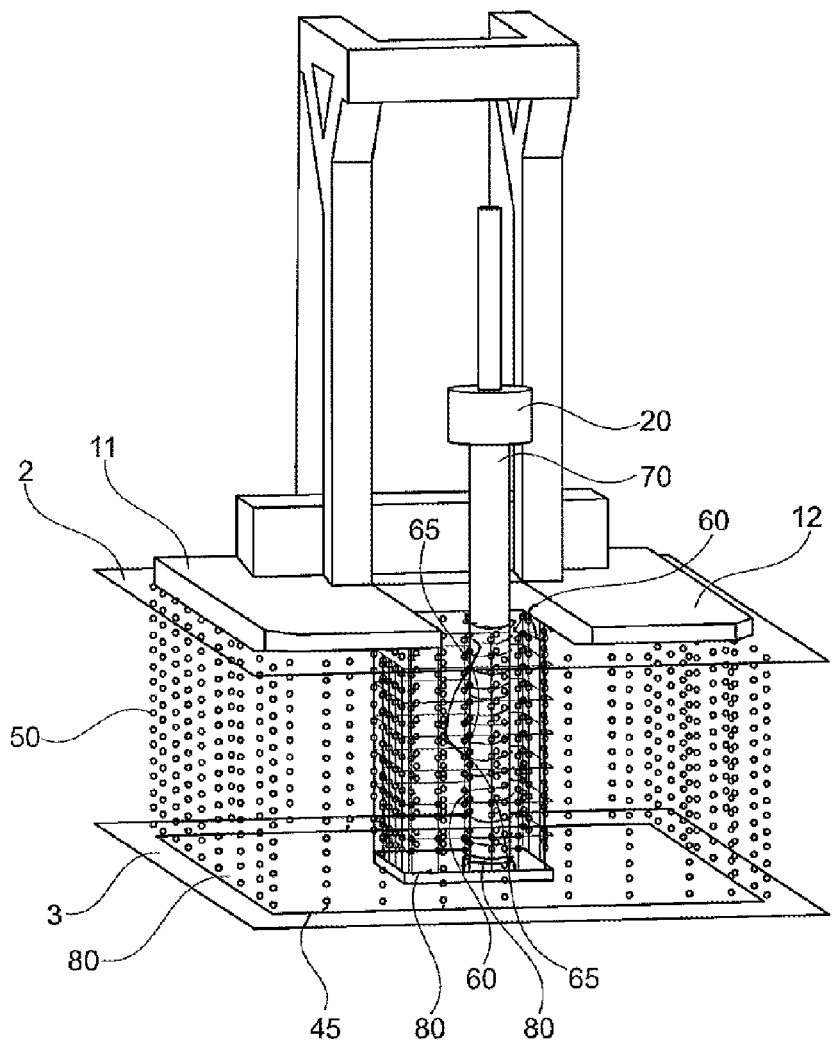
FIG. 17 shows a comprehensive illustration of the acoustic damping installations on a watercraft.

All three components of the hydraulic acoustic damping are shown conjointly with the watercraft 1 in FIG. 17. The object 70 to be introduced, for example a post, by way of the introduction installation 20 is piled into the bed of the body of water 3 between the two sub-hulls 11, 12. A support element 60 having damper elements 65 is disposed directly around the post 70. The first support element 60 extends from the bed of the body of water 3 to the water surface 2 and can optionally bear on the bed of the body of water 3.

A second support element 60 is disposed so as to be somewhat further away therefrom, thus so as to be radially spaced apart from the first support element 60. This support element 60 on the base side is also mounted on a rectangular frame 80 and extends to the water surface 2. Damper elements 65 which can be composed of gas-filled hollow panels or foam-material elements are fastened to the second support element 60 which configures an angular cross-section and is disposed within the void 15 between the two sub-hulls 11, 12. Conjointly with said hydraulic acoustic damper elements 65 and a bubble curtain 50 which by way of a compressed-air distribution installation 45 on the frame 80 runs from the bed of the body of water 3 to the surface of the body of water 2, further damping of the noise pollution created on account of the piling of the post can be effected. A plurality of compressed-air distribution installations 45 which are disposed at dissimilar height levels can be provided. The compressed-air distribution installations 45 can have outflow openings 46 which are oriented in dissimilar directions so as to configure a bubble curtain 50 having double walls which are mutually spaced apart.

The bubble curtain 50 which is configured externally about the watercraft 1 and which surrounds the hull 10 having the two sub-hulls 11, 12 and the void 15 situated therebetween forms the third damper component. Here too, a plurality of compressed-air distribution installations 45 can be disposed at dissimilar heights so as to achieve the desired characteristics of a bubble curtain 50 by way of dissimilar pressures or dissimilar outflow opening diameters.

The invention claimed is:

1. A watercraft, comprising:
 a hull which comprises at least two sub-hulls which are disposed mutually spaced apart and connected to one another by a cross-member, wherein the at least two sub-hulls each extend from the cross-member to sub-hull end and form a void between the at least two sub-hulls and the cross-member with at least one access to the void positioned between the at least two sub-hulls adjacent each sub-hull end, and wherein the hull has an outer periphery comprising a plurality of outer edges of the hull;
 an introduction installation for an object to be anchored in a bed of a body of water, said introduction installation being disposed on said hull;
 at least one compressor having at least one compressed-air line which is configured to lead into the body of water and is coupled to at least one compressed-air distribution installation which has a horizontal extent, wherein the at least one compressed-air distribution installation is configured for generating a first and second bubble curtain below the hull and has a multiplicity of mutually spaced apart outflow openings;
 at least one support element selected from the group consisting of a net, a tubular steel construction, plates and/or meshes, wherein the at least one support element is disposed below the hull and is configured to laterally surround the object to be anchored; and
 one or more gas-filled flexible damper elements fastened to one or more support elements of the at least one support element,
 wherein the first bubble curtain extends from the bed upward outside of a plane extending vertically downward from at least one of the plurality of outer edges of the hull to the bed and the outer periphery of the hull is at least partially surrounded by the bubble curtain, and wherein the second bubble curtain extends from the bed upward and inside and/or outside the at least one support element.

2. The watercraft as claimed in claim 1, wherein the at least one compressed-air distribution installation has a closed circumference.

3. The watercraft as claimed in claim 1 wherein the at least one compressed-air distribution installation is configured as a tube or hose.

4. The watercraft as claimed in claim 1 wherein the multiplicity of mutually spaced apart outflow openings are configured having identical mutual spacings.

5. The watercraft as claimed in claim 1 further comprising ballast installations disposed on the at least one compressed-air distribution installation.

6. The watercraft as claimed in claim 1 wherein the at least one compressed-air distribution installation is fastened so as to be lowerable on the hull by one or more holding installations.

7. The watercraft as claimed in claim 1 wherein the at least one compressed-air distribution installation extends about the external circumference of the hull.

8. The watercraft as claimed in claim 1 wherein the void is surrounded by the at least two sub-hulls, or has at least one lateral access.

9. The watercraft as claimed in claim 8, wherein the at least one compressed-air distribution installation surrounds the circumference of the void, or while bridging the at least one lateral access configures a circumferentially closed bubble curtain.

10. The watercraft as claimed in claim 1, wherein the at least one support element comprises a plurality of support elements wherein the plurality of support elements are disposed in a telescoping manner on one another, and wherein each of the plurality of support elements has dissimilar diameters or mutually corresponding internal and external dimensions, and are mounted so as to be displaceable into one another.

11. The watercraft as claimed in claim 1 wherein the bubble curtain surrounds the at least one support element.

12. The watercraft as claimed in claim 1 wherein the at least one support element is fastened to a frame.

13. The watercraft as claimed in claim 1 wherein the at least one compressed-air distribution installation is mounted on or in a frame comprising or comprised of a dimensionally stable material.

14. The watercraft as claimed in claim 12 wherein the frame has a U-profile, an H-profile, and/or a T-profile.

15. The watercraft as claimed in claim 12 wherein the frame is configured so as to be foldable or collapsible.

16. The watercraft as claimed in claim 12 wherein the frame is constructed from interconnected segments, wherein connection points of the interconnected segments permit a mutual relative movement of the interconnected segments.

17. The watercraft as claimed in claim 15 wherein the frame for opening and closing is assigned a drive.

18. The watercraft as claimed in claim 1 wherein the multiplicity of mutually spaced apart outflow openings are disposed on the at least one compressed-air distribution installation so as to be oriented in dissimilar directions.

19. The watercraft as claimed in claim 1 wherein the at least one compressed-air distribution installations includes a plurality of compressed-air distribution installations disposed at dissimilar heights.

20. The watercraft as claimed in claim 19 wherein at least some of the plurality of compressed-air distribution installations have dissimilarly sized outflow openings and/or dissimilarly high internal pressures.

21. The watercraft as claimed in claim 1 wherein the outer periphery of the hull is surrounded by the bubble curtain.

22. The watercraft as claimed in claim 1 wherein the one or more gas-filled flexible damper elements fastened to one or more support elements are inside the of the plane extending vertically downward from at least one of the plurality of outer edges of the hull to the bed.

* * * * *